Inventors
Thomas R. Smith &
Gerald W. Jones
by
Attorney

Feb. 23, 1960 T. R. SMITH ET AL 2,926,136
TUB MOUNTING ASSEMBLY
Filed Dec. 27, 1955 2 Sheets-Sheet 2
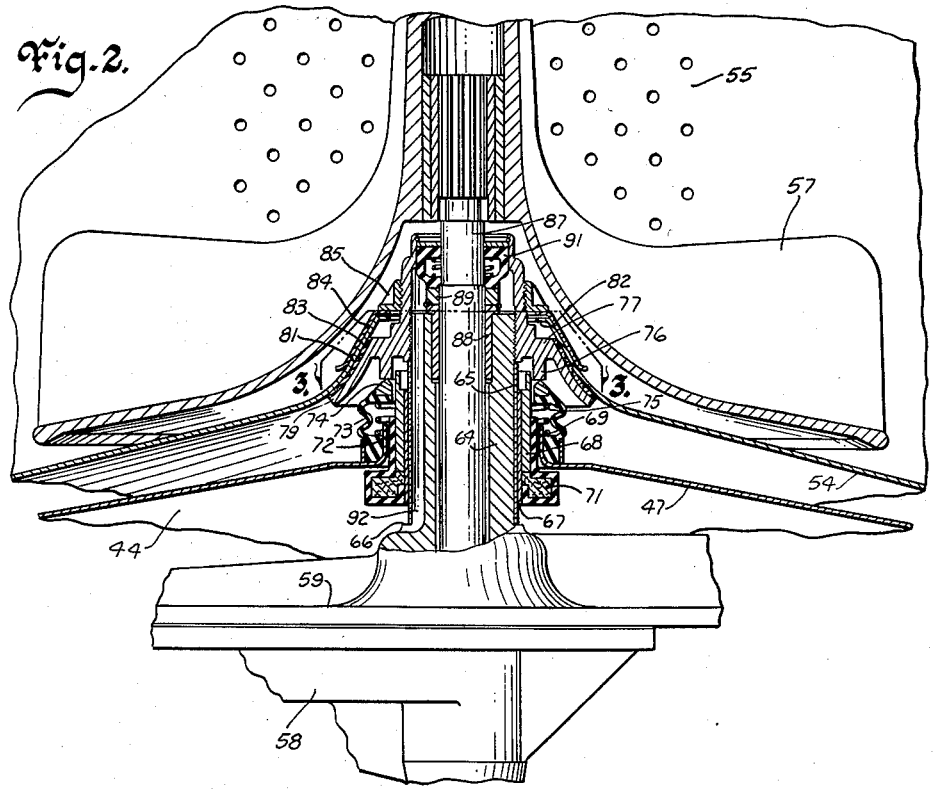
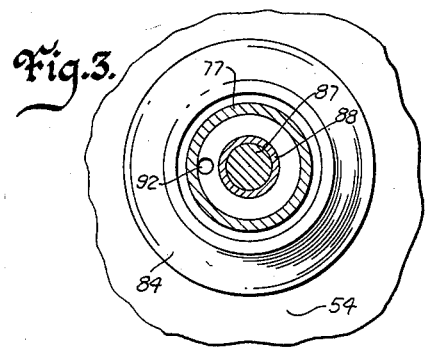
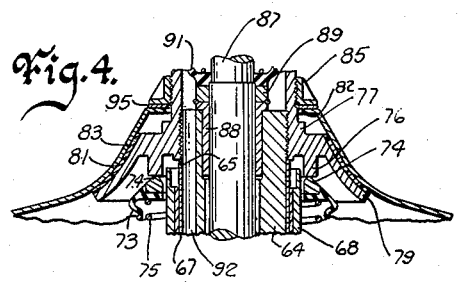
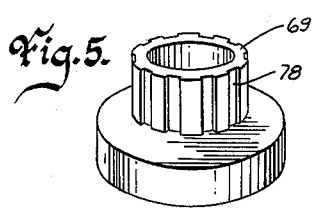
Inventors
Thomas R. Smith &
Gerald W. Jones
by *James* *Kelleton*
Attorney

United States Patent Office 2,926,136
Patented Feb. 23, 1960

2,926,136

TUB MOUNTING ASSEMBLY

Thomas R. Smith and Gerald W. Jones, Newton, Iowa, assignors to The Maytag Company, Newton, Iowa, a corporation of Delaware Application December 27, 1955, Serial No. 555,323

14 Claims. (Cl. 210—360)

This invention relates to an improved tub mounting assembly for washing machines. Specifically, this invention is directed to a means for providing a unitary connection between a revoluble spin shaft extending through an outer tub and an inner basket nested within that outer tub.

This is accomplished by providing an extension of the spin shaft with a tapered flange conforming substantially in contour to an apertured reentrant portion formed in the bottom of the inner tub and then wedging the tapered flange into the mating reentrant portion by means of a fastener threaded on the spin shaft extension protruding into the inner tub. The side of the flange not abutting the reentrant tub portion is provided with a depending annulus having a surface which is engaged by a sealing ring forming part of a bellows type seal which in turn is anchored to the outer tub to provide a water tight seal for the spin shaft while accommodating rotation of that shaft and the inner basket relative to the outer tub.

In the accompanying drawings:

Figure 2 is an enlarged fragmentary vertical sectional view of the embodiment shown in Figure 1;

Figure 3 is a cross sectional view taken on line 3—3 of Figure 2;

Figure 4 is an enlarged fragmentary sectional view of a second embodiment of our invention; and, Figure 5 is a perspective view of the rubber sealing member for the outer tub member.

Figure 1:
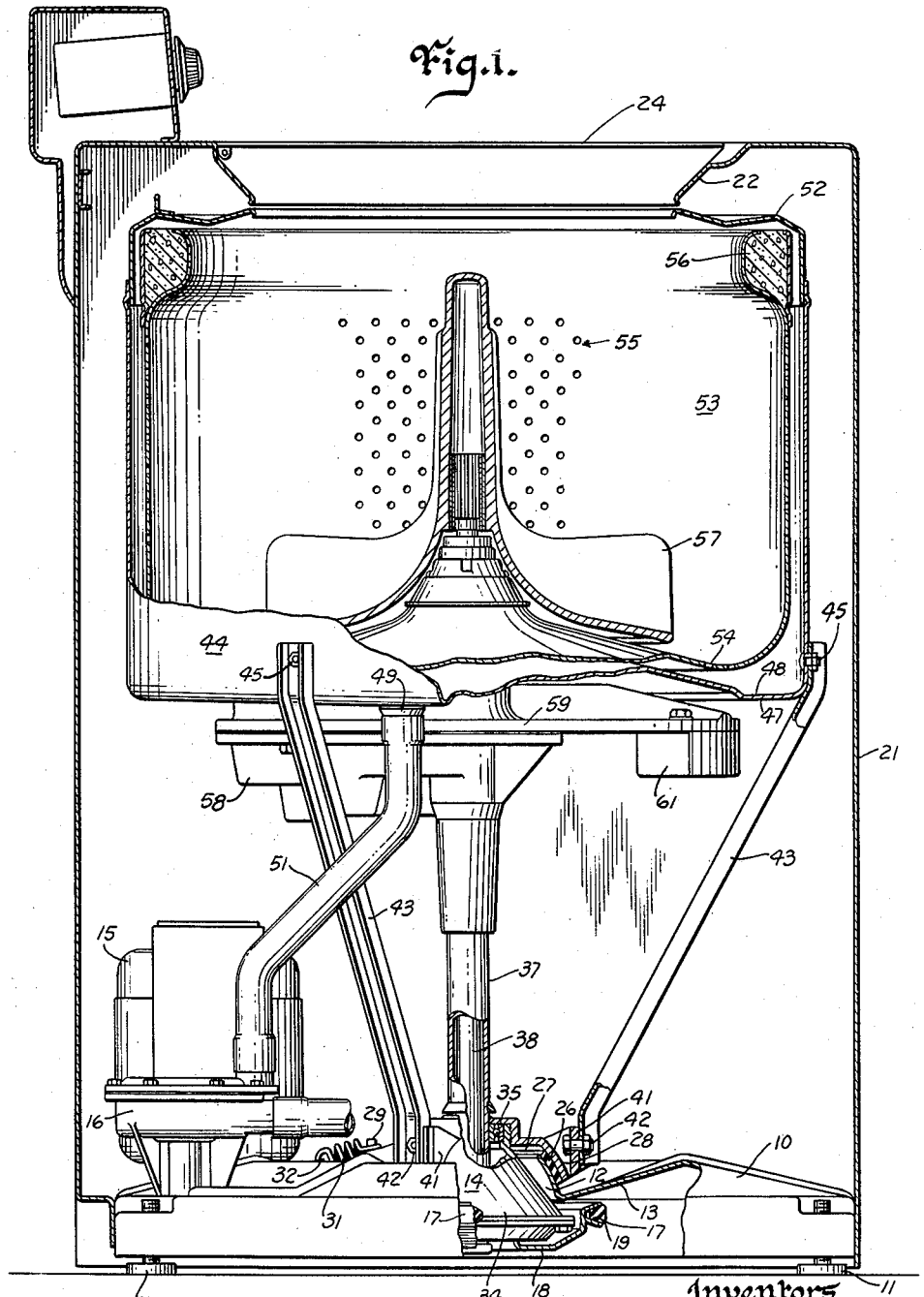
Figure 1 is a side elevation, partly broken away, showing a machine of the vertical axis type incorporating the preferred embodiment of our tub mounting construction.

In the accompanying drawings there is shown a base frame 10 mounted on adjustable feet 11 and provided with a supporting dome 12 rising out of a centrally located depression 13 in base frame 10. Dome 12 serves as a mounting for a drive assembly 14 such as that disclosed in the John D. Goodlaxson application, Serial No. 505,231, filed May 2, 1955, and assigned to the same assignee as that of the instant application.

Base frame member 10 also supports the up-ended reversible motor 15 and the water pump 16 which, like drive assembly 14, is driven by motor 15 through belt 17 on the under side of base frame 10. Numeral 19 designates the groove of pulley 18 which serves as the input member for the drive assembly 14.

Cabinet 21, attached to and enclosing base frame 10 together with the drive and tub assemblies supported thereby, is provided at its upper end with a depending annular flange 22 defining an access opening into the washing machine apparatus which is normally covered by access door 24.

In Figure 1 it can be seen that dome 12 in base frame 10 is provided with friction pads 26 at its periphery adjacent the opening 27 in its uppermost portion. An umbrella-like support member 28 rests on these friction pads 26 and is provided with three equally spaced ears 29 for three centering springs 31 which are fastened to brackets 32 connected to base frame 10. This arrangement centers support member 28 on dome 12 and restrains it from rotation relative to base frame 10.

Threaded into the umbrella support member 28 is a member 34 of substantially frusto-conical configuration which serves as a housing for drive assembly 14 of the previously identified Goodlaxson application Serial No. 505,231. Housing member 34 cooperates with umbrella support member 28 by gripping the outer race of a thrust bearing 35 which is provided with a tapered inner race. Mating with and seated in this tapered inner race of bearing 35 is the spin tube or shaft 37 which journals a power shaft 38 also extending into the drive assembly 14. With this construction all weight placed on the spin tube 37, housing 34 and on umbrella member 28 may be used to an advantage to provide ample frictional forces between umbrella member 28 and the friction pads 26 for dampening nutational movements of the shafts 37 and 38 relative to dome 12 while permitting rotational movement of spin tube 37 in thrust bearing 35.

While the details of the Goodlaxson assembly forming the basis for the previously identified application Serial No. 505,231 are not essential to the construction of the instant invention, its operation can be briefly explained for environmental purposes. Upon energization of motor 15 in a direction to rotate pulley 18 in a counterclockwise direction as viewed from the bottom of Figure 1, power shaft 38 is rotated in this same direction while spin shaft 37 is held against rotation by appropriate braking mechanism within housing 34. Upon the reversal of motor 15, spin shaft 37 is released for rotation to allow shafts 37 and 38 to be spun in unison in a clockwise direction.

With the drive and support constructions set forth above, it can be seen that shafts 37 and 38 may be selectively rotated as determined by the direction of rotation imparted to pulley 18 while permitting their nutation about a vertical axis at all times. In the washing machine illustrated in the accompanying drawings, shafts 37 and 38 nutate on a point determined by the intersection of the vertical axis of rotation with a horizontal plane bisecting groove 19 of pulley 18.

Now with reference to the tub assembly, it will be noted that umbrella support member 28 is provided with three recessed upstanding lugs 41 spaced equally from each other and alternately around member 28 with respect to the three ears 29. While not entirely obvious from Figure 1, it will be apparent from this description that there are three lugs 41 spaced 120° from each other each of which is 60° removed from an adjacent ear 29.

Fastened within the recessed lugs 41 by connectors 42 are the three tub brace members 43 which are, in this embodiment, of channel-like cross section. Brace members 43 extend outwardly and upwardly from umbrella support member 28 to join the non-rotatable imperforate outer tub 44 through tub connectors 45 to form an inverted tripod support for tub 44. The tub 44 is provided with a bottom wall 47 in which is formed a C-shaped gutter 48 having its lowermost portion converging into the drain outlet 49 which in turn communicates with the water pump 16 through the flexible drain hose 51.

The non-rotatable outer tub 44 is provided with a removable crown 52 which permits removal of the rotatable inner basket or tub 53 nested within tub 44. Inner tub 53 has a perforate bottom wall 54 and a perforate cylindrical side wall 55 which carries a concrete balancing ring 56 at its uppermost end. A conventional oscillating type agitator 57 is mounted within the spinner basket 53 to provide the proper agitation of fabrics placed within the tub assembly thus formed.

In order to drive agitator 57 during the agitation cycle and inner spin basket 53 during the fluid extraction cycle, the following connections to the drive assembly 14 are provided. Spin tub 37, extending into drive assembly 14, carries at its upper end the lower gear case cover 58 which in turn is bolted to the upper gear case cover 59 carrying counterweight 61 which balances the conventional motion converting unit housed by covers 58 and 59 and driven by power shaft 38.

In Figure 2 the upper gear case cover 59 is shown provided with a mounting stem 64 extending upwardly in a coaxial relationship to spin shaft 37 with which it forms a unitary extension. Mounting stem 64 carries a bearing spacer sleeve 65 which rotates with mounting stem 64 and has its lower end abutting shoulder 66 on the gear case cover 59. Rotation of mounting stem 64 produces a relative rotation between the spacer sleeve 65 and a sintered bronze bushing 67 which journals sleeve 65 and which is pressed into the self aligning outer bearing sleeve 68 to which the rubber sleeve 69 is molded. The lower portion of rubber sleeve 69 defines an oil reservoir which carries wicking 71 in contact with the sintered bushing 67 to provide the latter member with lubricant at all times. Rubber sleeve 69 fits into a centrally located opening formed by the upstanding flange 72 in the bottom tub wall 47 to allow the bearing structure just described to align itself with the mounting stem 64.

Flange 72 in wall 47 is encircled by a boot seal 73 which has its lower end clamped around flange 72 and its upper end provided with a carbon nose seal ring 74. Spring 75 within the boot seal 73 urges nose ring 74 upwardly against a smooth sealing surface provided by the annulus 76 depending from the flanged tub carrier member 77 which is threaded onto mounting stem 64 in abutting relationship to the upper end of spacer sleeve 65. This sealing engagement between ring 74 and annulus 76 provides a water tight seal for the mounting stem 64 while permitting relative movement to take place between the inner tub 53 and the outer tub 44. However, if fluids do seep between sealing ring 74 and annulus 76, they will flow downwardly through the vertical drain ports formed between upstanding flange 72 and the rubber sleeve 69 by means of the vertical grooves 78 located about the upper portion of the latter member as apparent from Figure 5.

Referring now to the means for connecting the inner tub 53 to the mounting stem 64, it will be noted that the flange 79 of tub carrier 77 is substantially of frusto-conical cross section with a slight radius being formed in its peripheral portion to provide a supporting seat for the inner tub 53. Tub 53 in turn is formed with an apertured reentrant portion 81 located in the central portion of its bottom wall 54 and formed with substantially the same configuration as the tub mounting flange 79.

This reentrant portion 81 is provided with centrally located inwardly directed horizontal flange 82 which strengthens the circular opening through which carrier 77 protrudes. Since, in actual construction of this tub asasembly, inner tub 53 is porcelain enameled while carrier 77 is formed of aluminum, a cork gasket 83 is cemented on the periphery of flange 79 to provide a water-tight seal and to assure a more uniform unit loading between these parts. Gasket 83 also provides a better frictional engagement between carrier 77 and tub 53 to prevent relative movement between these parts during the operation of the machine incorporating this construction.

While basket 53 may be wedged against flange 79 by either of the methods disclosed in Figures 2 and 4, Figure 2 discloses the preferred embodiment. That figure shows clamp washer 84 as having a flanged central apertured portion with a body tapered to produce a contour similar to that of reentrant portion 81. The periphery of washer 84 defines a rolled edge which facilitates removal of washer 84 from tub 53 and prevents its gouging the surface of tub member 53 once the tub mounting is assembled.

The large nut 85 threaded on the upper portion of carrier 77 is tightened onto the latter member so as to transmit forces produced by such a tightening action through the centrally located horizontal flanged portion of washer 84 and then into reentrant portion 81 through the tapered body portion of the washer 84. With nut 85 tightened against clamp washer 84 basket 53 becomes a unitary assembly with mounting stem 64 and spin shaft 37.

Now with reference to the drive to agitator 57, that agitator member is splined to the upper end of agitator shaft 87 which receives its rocking movements from the conventional motion converting unit housed between the gear housing covers 58 and 59 and driven by the power shaft 38. Agitator shaft 87 is journalled in bearing 88 which is seated in the recessed upper end of mounting stem 64. Collar 89, pinned to shaft 87, prevents downward movement of shaft 87 in an axial direction and serves as the reaction member for the spring urged shaft seal 91 located at the mouth of the flanged carrier member 77. While this sealing arrangement effectively seals shaft 87 during operation of agitator 57, a longitudinal drain passageway 92 is provided in the mounting stem 64 to permit seepage fluid to pass from tub 44 in case of deterioration or failure of seal 91.

It should be apparent from the description that the type movement imparted to the shaft 87 journalled in mounting stem 64 is not critical to the concept of the tub mounting assembly forming this invention and that either oscillatory, rotary or reciprocating shafts may be used to accomplish the washing action desired within tub 53. In addition, if the washing action to be provided within inner tub 53 is accomplished without the use of an agitator, it would be apparent that both mounting stem 64 and carrier 77 could be modified to eliminate this inner shaft construction entirely.

Now with reference to the second embodiment shown in Figure 4, it will be noted that a flat washer 95 has been substituted for the frusto-conical clamp washer 84 so that in the second embodiment the tightening forces produced by nut 85 are applied solely through the centrally located horizontal flange 82 of the reentrant portion 81 rather than through its exterior conical surface as accomplished in the first embodiment by the use of clamp washer 84. While the second embodiment is simpler in construction than the first, a more rigid connection is provided between the mounting flange 77 and the basket 53 through the use of embodiment shown in Figure 2.

With either of the described embodiments it should be apparent that upon rotation of drive assembly pulley 18 by motor 15 in a counterclockwise direction as viewed from the bottom of Figure 1, spin shaft 37 will be braked by mechanism within assembly 14 while power shaft 38 will cause agitator shaft 87 to oscillate agitator 57 within tube 53 in a conventional manner. Upon reversal of motor 15, pulley 18 will drive shafts 37 and 38 in unison to extract fluids from damp fabrics within tub 53 by means of the connection existing between tub 53 and spin shaft 37.

While mounting stem 64 may move slightly in the self-aligning bearing structure within flange 72 to produce relative movement between tub 53 and carrier 77 during the centrifugal extraction period, the flexible boot seal 73 will maintain a fluid tight seal with annulus 76 at all times.

In addition, it will be apparent that while an unbalanced loading of tub 53 may tend to deflect portions of basket 53 towards tub 44 during the centrifugal extraction period, the configuration of reentrant portion 81 provides a much more rigid construction than would be achieved if tub 53 were a flat bottomed container.

We claim:
1. A tub mounting assembly comprising, a tub including a frusto-conical reentrant portion, a mounting stem extending through said reentrant portion, said mounting stem including a carrier member abutting one side of said reentrant portion to form a seat therefor, a mounting washer conforming substantially in contour to said reentrant portion and abutting the opposite side thereof, and means connected to said mounting stem for rigidly wedging said carrier member and said mounting washer against said reentrant portion by axial movement relative to said reentrant portion to provide a rigid unitary connection between said tub and said mounting stem.

2. A tub mounting assembly comprising, a tub including a frusto-conical reentrant portion, a mounting stem extending through said reentrant portion into said tub, said mounting stem including a carrier member abutting one side of said reentrant portion to form a seat therefor, a mounting washer conforming substantially in contour to said reentrant portion and abutting the opposite side thereof, a flange on said washer spaced from said reentrant portion, and means abutting said flange and connected to said mounting stem within said tub for rigidly wedging said carrier member against said reentrant portion by axial movement relative to said reentrant portion to provide a unitary rigid connection between said tub and said mounting stem.

3. A tub assembly comprising, a tub including a frusto-conical reentrant portion, a mounting stem, a carrier member connected to said mounting stem and abutting one side of said reentrant portion to form a seat therefore, a frusto-conical member engaging the opposite side of said reentrant portion and means connected to said carrier member for rigidly wedging by relative axial movement said reentrant portion between said carrier member and said frusto-conical member to provide a rigid unitary connection between said tub and said mounting stem.

4. A tub mounting assembly comprising, a tub including an apertured and tapered reentrant portion, a mounting stem extending through said apertured reentrant portion, said mounting stem including a tapered flange abutting one side of said reentrant portion to form a seat therefor, a tapered mounting washer conforming in contour to said reentrant portion and abutting the opposite side thereof, and means connected to said mounting stem for rigidly wedging said reentrant portion between said flange and said washer by axial movement relative to said reentrant portion.

5. A tub mounting assembly comprising, a tub including an apertured and tapered reentrant portion, a mounting stem extending through said apertured reentrant portion, said mounting stem including a tapered flange abutting one side of said reentrant portion to form a seat therefor, cushioning material on said seat of said flange frictionally engaging said reentrant portion, a tapered mounting washer conforming in contour to said reentrant portion and abutting the opposite side thereof, and means connected to said mounting stem for rigidly wedging said reentrant portion between said flange and said washer by axial relative movement between said washer and said re-entrant portion to displace said cushioning material between said reentrant portion and said flange and produce a rigid connection between said tub and said mounting stem.

6. A tub mounting assembly comprising, a tub including an apertured and tapered reentrant portion, a mounting stem extending through said apertured reentrant portion, said mounting stem including a tapered flange abutting and mating with one side of said reentrant portion to form a seat therefor, a tapered washer mating with and abutting the opposite side of said reentrant portion, said washer including a terminal portion spaced from said reentrant portion, and means threaded on said mounting stem and abutting said terminal portion for rigidly wedging said reentrant portion between said flange and said washer by axial relative movement between said washer and said re-entrant portion.

7. A tub mounting structure comprising, a shaft, a tapered mounting flange connected to said shaft, a tub having a central tapered reentrant portion mating with and seated against said flange, a tapered clamping member abutting said central reentrant portion, gasket means positioned between said reentrant portion and said mounting flange, and means threaded on said mounting stem for forcing said clamping member against and axially relative to said central reentrant portion to compress said gasket means and establish a rigid connection between said mounting flange and said tub through said gasket means.

8. A connecting device for connecting a tub to a shaft comprising, a tub mounting stem including a tapered carrier member forming a support for said tub, said carrier member having a greater taper at its periphery than at its region immediately adjacent said mounting stem to form a seat at said periphery for said tub, said tub including an apertured and tapered reentrant portion mating with and seated against said carrier member, a tapered clamping washer abutting said reentrant portion, and means connected to said stem for forcing said tub against said seat and rigidly wedging said reentrant portion between said carrier member and said clamping washer by relative movement of the contacting surfaces of said washer and re-entrant portion to form a rigid connection between said carrier member and said tub.

9. In a washing machine having an outer tub and an inner tub nested therein and rotatable relative thereto by a shaft extending through said outer tub, a mounting device comprising, a tapered carrier member fixed on said shaft between said tubs, an apertured and tapered reentrant portion in said inner tub, said carrier member having a greater taper at its periphery than at its region adjacent said shaft to form a stabilizing seat at said periphery for said tub, said shaft extending through said apertured reentrant portion into said inner tub, and clamp means on said shaft for forcing said reentrant portion against said seat and for rigidly wedging said reentrant portion by axial relative movement between said clamp means and said re-entrant portion between said clamp means and said tapered carrier member to form a rigid unitary connection between said inner tub and said shaft.

10. In a washing machine having an outer tub and an inner tub nested therein and rotatable relative thereto by a shaft extending through said outer tub, a mounting device comprising, a tapered support flange on said shaft between said tubs, an apertured reentrant portion in said inner tub mating with and seated on said support flange, said shaft extending through said apertured reentrant portion into the interior of said inner tub, a frusto-conical washer abutting said reentrant portion and encircling said shaft within said inner tub, said frusto-conical washer having an inturned flange adjacent said shaft, and means connected to said shaft within said inner tub and abutting said inturned flange for rigidly wedging said reentrant portion between said washer and said support flange by axial relative movement between said washer and said reentrant portion.

11. In a washing machine having an outer tub and an inner tub nested therein and rotatable relative thereto by a shaft extending through said outer tub, a mounting device comprising, a tapered carrier member mounted on said shaft between said tubs, said carrier member including a peripheral portion progressively increasing in taper and forming a seat for said inner tub, an apertured reentrant portion in said inner tub mating with and seated on said carrier member, said shaft extending through said apertured reentrant portion into the interior of said inner tub, a washer abutting said reentrant portion and encircling said shaft within said inner tub, and means threaded on said shaft within said inner tub for forcing said inner tub against said seal and rigidly wedging said reentrant portion between said washer and said carrier member by axial relative movement between said washer and said reentrant portion.

12. In a washing machine having an outer tub and an inner tub nested therein and rotatable relative thereto by a shaft extending through said outer tub, a mounting device comprising, a tapered support member mounted on said shaft between said tubs, said support member including a peripheral portion progressively increasing in taper to form a seat for said inner tub, an apertured reentrant portion in said inner tub mating with said support member, cushioning material positioned between said support member and said reentrant portion, said shaft extending through said apertured reentrant portion into the interior of said inner tub, tapered clamping means contacting said reentrant portion within said inner tub, and means on said shaft for rigidly wedging by axial relative movement said reentrant portion between said clamping means and said support member to compress said cushioning material between said support member and said tub to form a rigid connection therebetween while compensating for surface irregularities between said support member and said reentrant portion.

13. In a washing machine, a tub, a shaft, a tapered carrier member on said shaft, said carrier member including a peripheral portion progressively increasing in taper and forming a seat for said tub, an apertured reentrant portion in said tub having a contour mating with that of said carrier member, said shaft extending through said apertured reentrant portion into said tub, a tapered clamping member positioned within said tub and encircling said shaft in frictional engagement with said reentrant portion, said clamping member having an inturned flange adjacent said shaft and spaced from said reentrant portion, gasket means positioned between said carrier member and said reentrant portion, and means connected to said shaft and engaging said inturned flange for compressing said gasket means by axial relative movement between said clamping member and said carrier member to form a rigid connection between said tub and said shaft while compensating for surface irregularities in said reentrant portion.

14. In a washing machine, a tub, a shaft, a tapered carrier member on said shaft, said carrier member including a peripheral portion progressively increasing in taper and forming a seat for said tub, an apertured reentrant portion in said tub having a contour mating with that of said carrier member, said shaft extending through said apertured reentrant portion into said tub, a tapered clamping member positioned within said tub and encircling said shaft in frictional engagement with said reentrant portion, said clamping member having a rolled peripheral edge and an inturned flange adjacent said shaft and spaced from said reentrant portion, gasket material positioned between said carrier member and said reentrant portion, and means connected to said shaft and engaging said inturned flange for compressing said gasket material by axial relative movement between said clamping member and said carrier member along said re-entrant portion to form a rigid connection between said tub and said shaft while compensating for surface irregularities in said reentrant portion.

References Cited in the file of this patent

UNITED STATES PATENTS

| | | |
|---|---|---|
| 1,253,987 | Lewis | Jan. 15, 1918 |
| 1,502,677 | Law | July 29, 1924 |
| 1,603,757 | Farrell | Oct. 19, 1926 |
| 2,406,187 | Bayless | Aug. 20, 1946 |
| 2,652,710 | De Remer | Sept. 22, 1953 |

FOREIGN PATENTS

| | | |
|---|---|---|
| 727,399 | Germany | Nov. 2, 1942 |
| 145,730 | Sewden | June 15, 1954 |